United States Patent Office 3,221,044
Patented Nov. 30, 1965

3,221,044
ESTERS OF 4,5,6-TRICHLOROISOPHTHALIC ACID
Paul E. Hoch, Youngstown, N.Y., assignor to Hooker Chemical Corporation, Niagara Falls, N.Y., a corporation of New York
No Drawing. Filed Aug. 6, 1962, Ser. No. 214,805
3 Claims. (Cl. 260—475)

This is a continuation-in-part of my application S.N. 818,543, filed June 8, 1959, now abandoned.

This invention relates to a trichloro aromatic dicarboxylic acid and novel methods for preparing such an acid and derivatives thereof. More particularly, this invention relates to the compound 4,5,6-trichloroisophthalic acid, the acid chloride and the esters and amides thereof.

These compounds are useful in the preparation of polymers which are, due to the high chlorine content, flame retardant in nature. The compounds of the present invention may also be used as flameproofing agents. In addition, the compounds of the present invention find utility as chemical intermediates.

It is a finding of this invention that 4,5,6,α,α,α-hexachloro-3-toluyl chloride when reacted with a base followed by acidification will yield 4,5,6-trichloroisophthalic acid.

The starting material 4,5,6,α,α,α-hexachloro-3-toluyl chloride is a novel compound, the preparation of which is disclosed in my copending application S.N. 818,517, filed June 8, 1959, now abandoned. The compound results from heating 3,4,5,6,7,7-hexachloro-3,6-methano-1,2,3,6-tetrahydroisophthaloyl chloride at a temperature of about 180 to 220 degrees centigrade. In accordance with the present invention, the chloro-toluyl chloride is reacted with a base such as the hydroxides of the alkali metals, sodium, potassium, rubidium and cesium, to produce the dialkali metal salt of 4,5,6-trichloroisophthalic acid. The dimetal salt is then acidified to produce 4,5,6-trichloroisophthalic acid. Suitable acidifying agents are the strong mineral acids such as hydrochloric acid, nitric acid, sulfuric acid and phosphoric acid, as well as strong organic acids such as toluene sulfonic acid and phenol sulfonic acid.

The trichloroisophthalic acid is converted to the acid chloride by reaction with a suitable reagent such as phosphorus pentachloride. In accordance with still other aspects of the invention, the acid chloride is reacted to form many amides and organic esters.

The following reactions and examples illustrate the findings of this invention but are not intended to limit the scope thereof.

1.

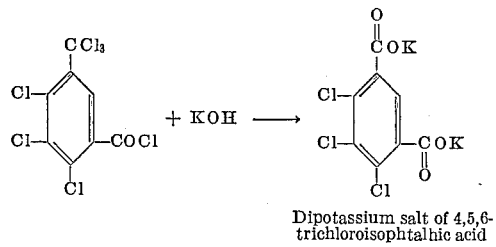

Dipotassium salt of 4,5,6-trichloroisophtalhic acid

2.

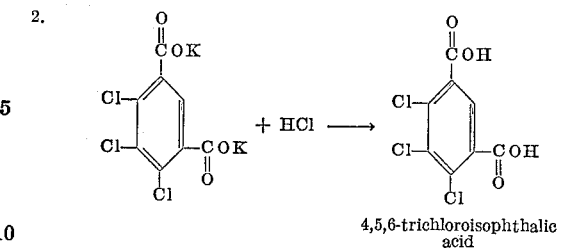

4,5,6-trichloroisophthalic acid

Example 1.—The preparation of 4,5,6-trichloroisophthalic acid

Three to four grams of the solid 4,5,6,α,α,α-hexachloro-3-toluyl chloride was refluxed with aqueous potassium hydroxide in excess until complete solution resulted (1½ hours). The solution was filtered and acidified with hydrochloric acid. A white solid was obtained weighing one to two grams. It recrystallized from a mixture of acetone and water as white feathery needles and had a melting point greater than 300 degrees centigrade.

Neutral equiv.: Theory 134.8; Found: 135.0.

Chlorine anal. for $C_8H_3O_4Cl_3$: Theory 39.6%; Found: 39.5%.

Example 2.—The preparation of 4,5,6-trichloroisophthaloyl chloride

Six grams of 4,5,6-trichloroisophthalic acid was reacted with an excess of phosphorus pentachloride. After solution was effected, it was refluxed 10–15 minutes. The phosphorus oxychloride formed was stripped under vacuum and the residue, a solid, was recrystallized from hexane and found to have a melting point of 72 degrees to 73 degrees centigrade.

Neutral equiv.: Theory 76.7; Found 77.4.

Analysis.—Calc'd for $C_8HCl_5O_2$: Cl, 57.9. Found: Cl, 57.4.

Example 3.—The preparation of the diallyl ester of 4,5,6-trichloroisophthaloyl chloride To a solution of 26.1 grams of 4,5,6-trichloroisophthaloyl chloride in 50 cc. benzene was added 9.9 grams of allyl alcohol at 25 degrees centigrade. The reaction was exothermic, the temperature rising to 30 degrees centigrade during an addition period of from 15 to 30 minutes. The reaction mixture was then stirred for six hours. At this point, the solution was washed with dilute sodium bicarbonate solution, then water. After drying over magnesium sulfate, the benzene was removed. The residual oil upon treatment with 1 percent benzoyl peroxide at 60 degrees centigrade polymerized to a clear resin that was self-extinguishing. Chlorine anal. of the redistilled liquid: $C_{14}H_{11}O_4Cl_3$: Theory, calc'd for Cl, 30.3%; Found: 31.0%.

Example 4.—Polymerization of the diallyl ester of Example 3

Five grams of the diallyl ester obtained in Example 3 above was treated with 0.05 gram benzoyl peroxide in a sealed tube. The peroxide dissolved upon heating. At a temperature of 60–70 degrees centigrade, the liquid polymerized and a hard transparent polymer was obtained. The polymer exposed to the flame of a Bunsen burner was found to be self-extinguishing.

*Example 5.—The preparation of an amide of 4,5,6-trichloroisophthaloyl chloride*

Two grams (0.0065 mole) of 4,5,6-trichloroisophthaloyl chloride in 10 ml. of acetone was added to 100 ml. of concentrated ammonium hydroxide. The mixture was stirred five minutes, water was added and the white solid collected. Recrystallization of the solid from isopropanol yielded white needles, M.P. 289–290 degrees centigrade. Calc'd for $C_8H_5Cl_3O_2N_2$: Cl, 39.4; Found: Cl, 39.6.

*Example 6.—The preparation of an amide polymer of 4,5,6-trichloroisophthaloyl chloride*

A solution of 6.8 grams of piperazine, and 10.6 grams of sodium carbonate in 250 ml. water was stirred vigorously. To the solution was added a solution of 30.6 grams of 4,5,6-trichloroisophthaloyl chloride in 125 ml. chloroform. The mixture was agitated by a high speed mixer for ten minutes. The chloroform phase was separated, and the chloroform was evaporated, to isolate the polymer. The resulting polymer contained nitrogen and chlorine by analysis and was used to form films.

Using the method of Example 3, many additional organic esters are readily prepared. Suitable alcohols for the reaction with the acid chloride are the aliphatic monohydric, dihydric and polyhydric alcohols. Typical monohydric alcohols include the following: methyl alcohol; ethyl alcohol; n-propyl alcohol; isopropyl alcohol; n-butyl alcohol; secondary butyl alcohol; n-amyl alcohol; isoamyl alcohol; cyclohexanol; and the lower alkenols, such as allyl alcohol and methallyl alcohol; and the like. Typical dihydric alcohols include: ethylene glycol; diethylene glycol; propylene glycol; dipropylene glycol; 1,4-butanediol; 1,3-butanediol; 1,2-butanediol; 1,2-pentanediol; 1,3-pentanediol; 1,4-pentanediol; 1,5-pentanediol; 1,6-hexanediol; neopentyl glycol; and the mono-unsaturated, lower aliphatic diols, such as 1,4-butenediol and 1,4-butynediol; and the like. Typical polyhydric alcohols include: glycerol; hexanetriol; butanetriol; trimethylol propane; trimethylol ethane; pentaerythritol; and the like.

Using the method of Example 5, many organic amides are readily prepared by replacing the ammonia with an organic amine. Suitable amines for the reaction with the acid chloride are the aliphatic amines such as methylamine, ethylamine, propylamine, alkylamine, isopropylamine, butylamine, amylamine, hexylamine, cyclohexylamine, dimethylamine, diethylamine, dipropylamine, dialkylamine, diisopropylamine, dibutylamine, diamylamine and dihexylamine. Also suitable are cyclic amines such as piperazine, morpholine and melamine.

Although this invention has been illustrated by citing specific details of given species embraced within the scope of the invention, it is to be understood that various modifications within the invention are possible without departing from the spirit and scope thereof.

What is claimed is:
1. A diester of 4,5,6-trichloroisophthalic acid and a mono-unsaturated, lower aliphatic alcohol and 1 to 2 hydroxyl groups.
2. A di(lower alkenyl)-4,5,6-trichloroisophthalate.
3. Diallyl 4,5,6-trichloroisophthalate.

References Cited by the Examiner

UNITED STATES PATENTS

| | | | |
|---|---|---|---|
| 1,591,245 | 7/1926 | Stockelbach | 260—515 |
| 2,318,684 | 5/1943 | Gaylor | 260—687 |
| 2,433,616 | 12/1947 | Marple et al. | 260—475 |
| 2,462,601 | 2/1949 | Bohrer | 260—475 |
| 2,676,187 | 4/1954 | Foster et al. | 260—544 |
| 2,791,608 | 5/1957 | Golding | 260—544 |
| 2,814,648 | 11/1957 | Heisenberg et al. | 260—651 |
| 2,823,230 | 2/1958 | Raecke | 260—515 |
| 2,856,425 | 10/1958 | Schreyer | 260—544 |
| 3,014,965 | 12/1961 | Newcomer et al. | 260—515 X |

FOREIGN PATENTS

| | | |
|---|---|---|
| 167,617 | 8/1953 | Australia. |
| 547,375 | 10/1957 | Canada. |

OTHER REFERENCES

Beilstein: vol. 9, p. 838.
Beilstein: vol. 9, Supplement I, page 372.
Beyer: Journal fur Praktische Chemie, N.F., Band 22 (1880), p. 352, TP 1 J89.
"Liebigs Annalen," vol. 3, pp. 262–266 (1832).
Moeller: "Inorganic Chemistry" (New York, 1952) page 306ff.
Pollak et al.: Monatschefte fur Chemie, Band 43, 922, p. 221. QD 1M 73.
Tawney: Abstract of Application, Serial No. 752,834, publ. Jan. 10, 1950, 630 O.G. 595.

LORRAINE A. WEINBERGER, *Primary Examiner.*

LEON ZITVER, *Examiner.*